United States Patent [19]

Yoshiwa et al.

[11] Patent Number: 4,467,958
[45] Date of Patent: Aug. 28, 1984

[54] SOLAR-HEATING SYSTEM

[75] Inventors: Masao Yoshiwa, Kobe; Yoshiro Hujioka; Masakuni Tokai, both of Hyogo; Mikio Muro, Akashi, all of Japan

[73] Assignee: Ministry of International Trade and Industry of Japan, Tokyo, Japan

[21] Appl. No.: 422,460

[22] Filed: Sep. 23, 1982

[30] Foreign Application Priority Data

Jun. 23, 1982 [JP] Japan ................................. 57-106960

[51] Int. Cl.$^3$ ............................................ G05D 23/00
[52] U.S. Cl. .................................... 237/2 B; 62/235.1; 62/476; 126/427
[58] Field of Search ................ 237/2 B; 126/427, 428; 62/324.1, 235.1, 476, 238.3

[56] References Cited

FOREIGN PATENT DOCUMENTS 51-77741 7/1976 Japan .

OTHER PUBLICATIONS

"Cooling and Heating Systems with Heat Storage", Isao Nikai Refrigeration, vol. 55, No. 628, Feb. 1980.

Primary Examiner—Albert J. Makay
Assistant Examiner—Henry Bennett
Attorney, Agent, or Firm—Leydig, Voit, Osann, Mayer and Holt, Ltd.

[57] ABSTRACT

A solar heating system including a chemical heat pump for storing thermal energy by converting same into energy in the form of a difference in the concentration of an aqueous multiple-component chemical solution which actuates the chemical heat pump, and a solar collector of a low temperature solar collection type operative to collect excess thermal energy of the sun not used for heating and cooling purposes during the time intermediate the solar irradiance abundant season and the solar irradiance scarce season, or spring and autumn, and store same in the chemical heat pump as energy in the form of a difference in the concentration of an aqueous multiple-component chemical solution. Warm water obtained by heating water by the solar heat collector is supplied in the wintertime to the chemical heat pump as a low temperature heat source and control of flow of a working medium is effected depending on the amount of the solar energy collected in the wintertime, so as to thereby increase the efficiency with which the solar energy is utilized during the intermediate season and winter.

2 Claims, 4 Drawing Figures

SOLAR-HEATING SYSTEM

FIELD OF THE INVENTION

This invention relates to solar-heating systems in general, and more particularly it is concerned with a solar-heating system capable of storing the thermal energy of the sun during the time intermediate between the solar irradiance abundant season and the solar irradiance scarce season or during spring and autumn by converting same into energy in the form of a difference in the concentration of a multiple-component aqueous chemical solution and utilizing the stored energy in the wintertime for heating purposes by converting same back into thermal energy, to thereby increase the rate of utilization of the solar energy in carrying out heating.

DESCRIPTION OF THE PRIOR ART

In one method known in the art of storing thermal energy, thermal energy is converted into energy in the form of a difference in the concentration of an aqueous chemical solution to be stored for future use. This method is described in detail, for example, in the article entitled 'Cooling and Heating Systems with heat storage' appearing in the periodical 'Refrigeration', vol. 55, No. 628 (pp. 99–109), February 1980 number, and Japanese Patent Laid-Open No. 77741/76.

Figure 1:
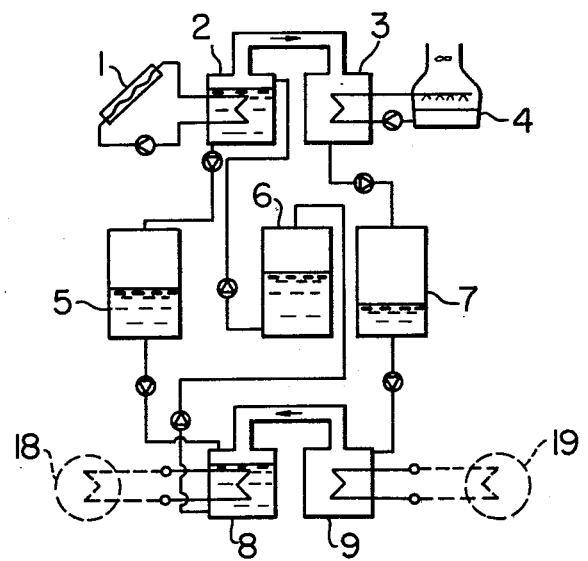
FIG. 1 is a view in explanation of a long-term thermal storage system of the prior art.

The method will be outlined by referring to FIG. 1, wherein a low concentration aqueous solution of a multiple-component chemical compound, such as sodium hydroxide (NaOH), stored in a low concentration liquid tank 6 is withdrawn therefrom and transferred to generator 2 where the aqueous solution is concentrated by vaporization of the water performed by utilizing thermal energy collected by means of a solar collector 1. The aqueous solution thus concentrated is stored in a high concentration liquid tank 5 while the vapor produced by vaporization of the water is cooled at a condenser 3 with cooling water circulated through a cooling tower 4, to be condensed into a condensate which is stored in a condensate tank 7. In this way, part of the thermal energy of the sun collected by the solar collector 1 is stored as energy in the form of a difference in the concentration of an aqueous solution of sodium hydroxide. The energy in the form of a difference in concentration which is stored in this way can be put to reuse with a high degree of efficiency as energy for driving a chemical heat pump.

Referring to FIG. 1 again, the high concentration aqueous solution is transferred from the liquid tank 5 to an absorber 8, and the condensate is transferred from the condensate tank 7 to an evaporator 9. With the absorber 8 and the evaporator 9 being maintained in communication with each other, the condensate is vaporized in the evaporator 9 by a low vapor partial pressure of the aqueous solution of the high concentration into vapor which is transferred to the absorber 8 where it is condensed and absorbed into the high concentration aqueous solution. Assume that a cooling load 19 is connected to the evaporator 9 and a heating load 18 is connected to the absorber 8. Then it is possible, when heating is carried out, to transfer heat from the low temperature side to the high temperature side or the heating load 18 as latent heat is transferred, to thereby provide a heat pump. However, efficient use of a heat pump for heating purposes in the wintertime requires a design to be worked out thermodynamically with regard to a low temperature heat source to be connected to the evaporator 9, the combination of the heat source with a heat flow through the heat pump, etc. For example, if outdoor air is utilized as a low temperature heat source, there would be the risk of the water used as a coolant freezing, making it impossible to operate the heat pump.

SUMMARY OF THE INVENTION

This invention has as its object the provision of a solar heating system capable of converting thermal energy stored during the time intermediate between the solar irradiance abundant season and the solar irradiance scarce season into energy in the form of a difference in the concentration of an aqueous chemical solution and taking out the accumulated energy, when necessary, for use in operating with a high degree of efficiency a heat pump using the stored energy as energy for operation to perform a heating operation in the wintertime.

The aforesaid object of the invention is accomplished by the system according to the invention in which warm water produced by heating water with the solar energy collected by solar collectors, preferably of a low temperature solar collection type, is used as a low temperature heat source connected to the evaporator of a heat pump, and the low temperature heat source, the heat pump, another heat source, such as a fossil fuel boiler, and a heating load are suitably connected together in accordance with the amount of solar energy collected and the amount of heat and the temperature required for effecting heating.

The invention enables collection of solar heat to be effected efficiently in the wintertime without the risk of the coolant freezing and allows the rate of utilization of the solar energy throughout the year to be greatly raised due partly to utilization for operating a heat pump of thermal energy of the solar energy stored during the time intermediate between the solar irradiance abundant season and the solar irradiance scarce season.

The above and further objects and novel features of the invention will more fully appear from the following detailed description when same is read in connection with the accompanying drawings. It is to be expressly understood, however, that the drawings are for purposes of illustration only and are not intended as a definition of the limits of the invention.

DETAILED DESCRIPTION OF THE PREFERRED EMBODIMENT

Figure 2:
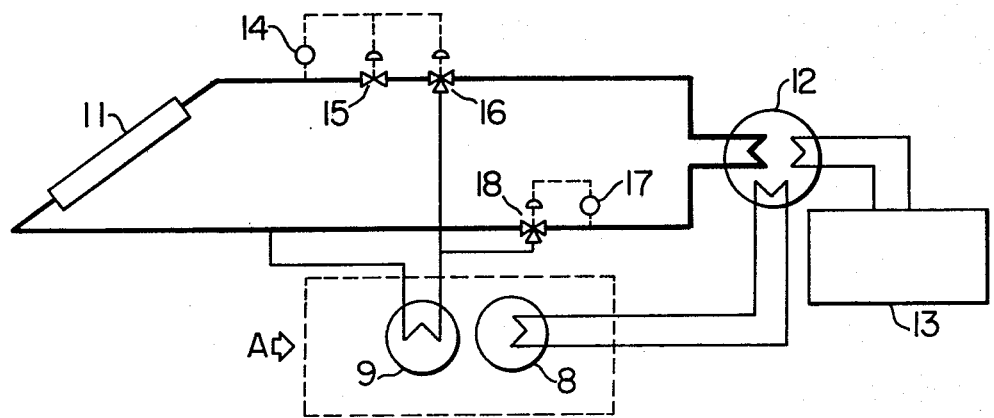
FIGS. 2–4 are views in explanation of the construction of the solar heating system according to the invention and the operation thereof.

FIG. 2 shows a preferred embodiment of the invention in which warm water produced by heating water with thermal energy collected by a solar collector 11 has its temperature sensed by a thermometer 14 at an outlet of the collector 11. The temperature thus sensed is compared with a predetermined heating temperature, and a throttle valve 15 is actuated to control the flow rate of the warm water. When the temperature of the warm water having its flow rate controlled in this way exceeds the predetermined heating temperature, a three-way valve 16 is actuated to let the warm water flow directly into a heating load 12. The warm water released from the heating load 12 has its temperature sensed by a thermometer 17 again, and when the temperature sensed is above a preset temperature level, another three-way valve 18 is actuated to return the warm water to the solar collector 11. Bold lines in FIG. 2 represent the flow of the warm water in the aforesaid condition. The chemical heat pump shown in FIG. 1 is designated by the symbol A in FIG. 2 wherein parts other than the evaporator 9 and the absorber 8 are not shown. Both the heat pump A and a fossil fuel boiler 13 need not be rendered operative in the aforesaid condition in which collection of the solar energy is carried out satisfactorily, and heating can be effected with the solar energy alone.

Figure 3:
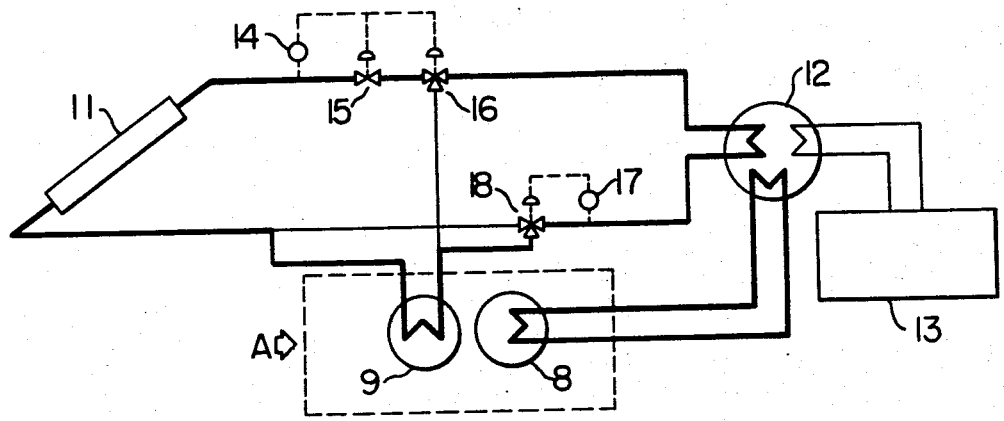

FIG. 3 shows the flow of the warm water which takes place when the temperature thereof sensed by the thermometer 17 fails to reach the preset temperature level, although the flow of the warm water which has a temperature high enough as sensed by the thermometer 14 to be led to the heating load 12 through the three-way valve 16 is shown in the same manner as shown in FIG. 2. More specifically, the warm water released from the heating load 12 is led to the evaporator 9 of the heat pump A through the three-way valve 18 in which the temperature of the warm water is raised to a high level by the heat pump A, so as to supply heat to the heating load 12 through the absorber 8.

Figure 4:
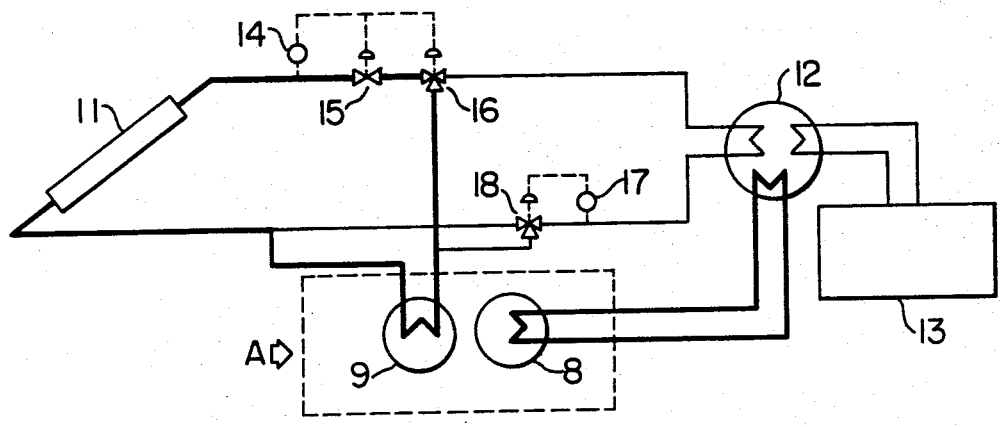

In FIG. 4, the warm water shown as flowing through the system has a temperature sensed by the thermometer 14 which does not reach the predetermined heating temperature level after actuation of the throttle valve 15. More specifically, the warm water released from the collector 11 is led through the three-way valve 16 to the evaporator 9 of the heat pump A, not to the heating load 12. The solar energy of a low temperature in the warm water is supplied, as is the warm water shown in FIG. 3, to the heating load 12 after being brought to a high temperature condition by the heat pump A. If the amount of solar irradiance is not high enough, the fossil fuel boiler 13 is actuated, for example, to supply the necessary heat from the combustion heat source. When the solar energy is not obtainable at all, due to rain, for example, enough thermal energy is supplied to the heating load 12 to carry out heating from the fossil fuel boiler 13 along.

The following are the results of tests conducted on the solar-heating system according to the invention to determine the effective rate of utilization of the solar energy obtained when the system was used for heating an office building with a floor space of 1500 m² located in Tokyo.

(1) Meteorological Data Used in the Tests: Statistical Values Obtained in Tokyo.
(2) Particulars of the Solar Collector:
 a. Flat-Plate Type Solar Collector of Double Glass Pane.
 b. Collector-Absorber Plate Coated with a Black Paint.
 c. Orientation; Due south; Tilt Angle, 30 Degrees
 d. Collector's Area, 500 m².
(3) Operating Conditions
 a. Temperature Conditions
  i. Operation of the Solar Collection System (Solar Collector Combined with heating load) (FIG. 2)
   Solar Collector Inlet Temperature, 45° C.
   Solar Collector Outlet Temperature, 50° C.
  ii. Operation of the Combined System (Solar Collection System+Thermal Storage System) (Solar Collector Combined with heating load and chemical heat pump) (FIG. 3)
   Solar Collector Inlet Temperature, 40° C.
   Solar Collector Outlet Temperature, 50° C.
   Evaporator Inlet Temperature, 45° C.
   Evaporator Outlet Temperature, 40° C.
  iii. Operation of the Thermal storage System (Solar Collector and Chemical heat pump combined with heating load) (FIG. 4)
   Solar Collector Inlet Temperature, 20° C.
   Solar Collector Outlet Temperature, 25° C.
   Evaporator Inlet Temperature, 25° C.
   Evaporator Outlet Temperature, 20° C.
 b. System Operation Time, from 9:00 AM to 5:00 PM
(4) Calculation Period, December, January and February $$\text{Coefficient of Performance} \left( \frac{\text{Amount of Heat Released from Absorber}}{\text{Amount of Heat Led into Evaporator}} \right) \quad (5)$$

of the Chemical Heat Pump
 System Shown in FIG. 3, 0.985
 System Shown in FIG. 4, 0.959
(6) Results of the Calculation (Thermal Capacitance Supplied to the Heating Load)

When heating was effected with the solar energy alone, the amount was 48,023 M cal. However, when heating was carried out by using the combination of the solar collector and the chemical heat pump according to the invention, the amount increased to 54,720 M cal, indicating that the solar energy rate to be used as heating load is higher in the invention than in the prior art by about 14%.

While a preferred embodiment of the invention has been described using specific terms, such description is for illustration purposes only, and it is to be understood that changes and variations may be made without departing from the spirit or scope of the following claims.

What is claimed is:

1. A solar heating system comprising:
 a solar heat collector for collecting solar energy;
 a chemical heat pump for storing thermal energy of the sun collected by said solar heat collector as energy in the form of a difference in the concentration of an aqueous chemical solution, said chemical heat pump comprising an evaporator actuated by the stored thermal energy of the sun, and an absorber;
 a heat source for generating thermal energy other than the thermal energy of the sun;
 first line means for allowing warm water to flow between said solar collector, said chemical heat pump and a heating load in circulation; and
 second line means for allowing a heating medium to flow between said chemical heat pump and said heating load;
 control means mounted in said first line means for sensing the temperature of warm water flowing through said first line means and controlling the flow rate and the flow channel of the warm water;
 wherein the improvement resides in that:
 said control means is operative (a) to sense an outlet temperature of said solar collector and, when said outlet temperature exceeds a predetermined heating temperature level, to allow the warm water released from the solar heat collector to flow directly to the heating load and, when the outlet temperature of the heating load exceeds a preset temperature level, to allow the warm water released from the heating load to flow directly to the solar heat collector without passing through said heat pump; (b) to allow, when the preset temperature level is not exceeded, the warm water released from the heating load to flow through a line of said first line means extending through the evaporator of the chemical heat pump to raise the temperature of the heating medium in said second line means extending through the absorber of the chemical heat pump until the outlet temperature of the heating load reaches the preset temperature level, to supply pumped heat to the heating load again while returning the warm water flowed through the evaporator to the solar heat collector; (c) to apply, when the temperature of the warm water released from the solar heat collector at the outlet thereof is below the predetermined heating temperature level and the temperature of the heating medium does not reach the predetermined heating temperature even when the warm water is allowed to flow through said line of said first line means extending through the evaporator of the heat pump to heat the heating medium by means of the heat pump, said heat source for generating thermal energy other than the thermal energy of the sun to the heating load simultaneously as said solar collector is operated; and (d) to allow, when it is impossible to collect heat by means of the solar collector, heating to be carried out by using only said heat source generating thermal energy other than the thermal energy of the sun.

2. A solar heating system as claimed in claim 1, wherein said heat source for generating thermal energy other than the thermal energy of the sun comprises a fossil fuel boiler.

* * * * *

UNITED STATES PATENT AND TRADEMARK OFFICE
CERTIFICATE OF CORRECTION

PATENT NO. : 4,467,958
DATED : August 28, 1984
INVENTOR(S) : Masao Yoshiwa, Yoshiro Hujioka, Masakuni Tokai, and Mikio Muro It is certified that error appears in the above-identified patent and that said Letters Patent is hereby corrected as shown below:

On the face of the patent, line 7, change Assignee's name from "Ministry of International Trade and Industry of Japan" to --Director-General of the Agency of Industrial Science and Technology--.

Signed and Sealed this

Eighth Day of August, 1989

Attest:

DONALD J. QUIGG

*Attesting Officer*  *Commissioner of Patents and Trademarks*